May 17, 1949.  E. GUDMUNDSSON  2,470,553
PROTECTING RELAY FOR LIQUID-FILLED
ELECTRICAL APPARATUS
Filed Aug. 6, 1947
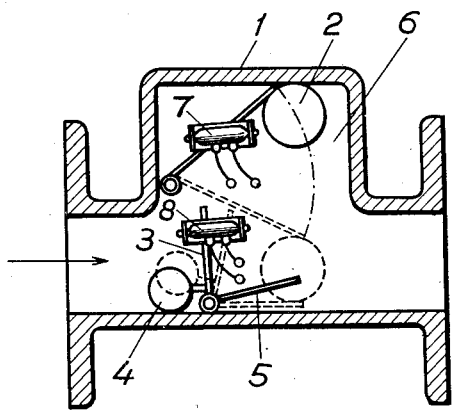
Inventor
Erik Gudmundsson.
By James Aiken
Attorney.

Patented May 17, 1949

2,470,553

UNITED STATES PATENT OFFICE 2,470,553

PROTECTING RELAY FOR LIQUID-FILLED ELECTRICAL APPARATUS

Erik Gudmundsson, Ludvika, Sweden, assignor to Allmänna Svenska Elektriska Aktiebolaget, Vasteras, Sweden, a Swedish corporation Application August 6, 1947, Serial No. 766,705
In Sweden November 6, 1941

Section 1, Public Law 690, August 8, 1946
Patent expires November 6, 1961

1 Claim. (Cl. 200—84)

For liquid-filled electrical apparatus, protecting relays of liquid type, or as they are also called gas-relays, are often used. The characterizing feature of the common type of these relays is that they are provided with two contact members, which are each one affected by a float. The upper of these floats works at a certain lowering of the level of the liquid on account of the pressure of the gas developed at occurring faults in the apparatus to be protected, generally a transformer and which gas is collected in the protecting relay. The lower float works, when the gas development exceeds a certain momentaneous value. At larger faults in the transformer or the apparatus to be protected a luminous arc generally arises, which breaks up the surrounding fluid. The gas violently developed thereby presses the fluid up into the expansion vessel of the transformer, and the fluid gets into rapid flowing through the protecting relay arranged between the transformer case and the expansion vessel.

It has been found that on account of large friction surfaces against the liquid flowing, the working of the lower float will be depending on the viscosity of the fluid. In order to avoid this drawback the float has been provided with a screen or a retarding plate arranged so that the float will be lying in the dead current of the retarding plate. A protecting relay in this arrangement has thus two contact members, one of which is as before affected by the upper float at a certain lowering of the level of the liquid and the other is affected partly by the screen at a certain flowing speed of the liquid and partly by the lower float at a certain further lowering of the level of the liquid.

As bases for the present invention lies the surprising experience that the lower float can be entirely avoided, if the contact member last-mentioned is arranged to be affected by the float first-mentioned. Hereby an extraordinary simplification of the protecting relay is gained, which clearly appears from the attached drawing, which ilustrates a form of arrangement of such a relay in longitudinal elevation. In the following we assume that the apparatus to be protected by the gas-relay is an oil-filled transformer.

The drawing shows the housing 1 of the protecting relay, a turnably journalled float 2 and a likewise turnably journalled screen 3, which is provided with a counter weight 4 and a catching member 5.

When the relay is filled with oil under normal service, the float 2 has its highest position shown on the drawing with full lines. As the gas is collected in the highest part 6 of the relay, the oil level in this part is pressed down and the float sinks. The mercury switch 7 connected to the float is adjusted, so that it operates when the float has sunk a certain way. Thereby a signal circuit is generally closed.

If the oil level is further pressed down or if the expansion vessel and the gas-relay are rapidly emptied from oil when for instance the explosion valve of the transformer operates or oil leakage by other reason occurs, the float sinks down to the bottom of the relay and thereby takes the catching member 5 with it. The screen 3 is thereby turned over to the position shown in dashed lines on the drawing. The mercury switch 8, which follows the movements of the screen then closes a circuit, which releases the circuit breaker of the transformer.

The screen is otherwise, as mentioned above, only intended to work when a violent gas development causes a rapid flowing of the oil through the relay in the direction of the arrow.

I claim as my invention:

A protecting relay for liquid-filled electrical apparatus, comprising a casing through which the liquid may flow, two switches, a float in the casing, means so connecting one of said switches to said float that an initial lowering of the float actuates said switch, a movable screen actuated by the flow of liquid through the casing, means for connecting the other switch to said screen, and a catching member actuated with the said screen and engaged by the said float when the latter is in a lower position.

ERIK GUDMUNDSSON.

REFERENCES CITED

The following references are of record in the file of this patent:

UNITED STATES PATENTS

| Number | Name | Date |
|---|---|---|
| 1,653,177 | Herz | Dec. 20, 1927 |
| 1,997,121 | Rottmann | Apr. 9, 1935 |